(12) United States Patent
Choi et al.

(10) Patent No.: US 12,218,343 B2
(45) Date of Patent: Feb. 4, 2025

(54) ELECTRODE MANUFACTURING METHOD COMPRISING CLEANING STEP USING LASER, ELECTRODE MANUFACTURED BY METHOD, AND SECONDARY BATTERY COMPRISING SAME

(71) Applicant: LG Energy Solution, Ltd., Seoul (KR)

(72) Inventors: Hyoung Sik Choi, Daejeon (KR); Jun Hyeak Huh, Daejeon (KR); Jeoung Soo Kim, Daejeon (KR); Ki Woong Kim, Daejeon (KR); In Gu An, Daejeon (KR); Ki Eun Sung, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 752 days.

(21) Appl. No.: 17/433,858

(22) PCT Filed: Jan. 21, 2021

(86) PCT No.: PCT/KR2021/000816
§ 371 (c)(1),
(2) Date: Aug. 25, 2021

(87) PCT Pub. No.: WO2021/157915
PCT Pub. Date: Aug. 12, 2021

(65) Prior Publication Data
US 2022/0149355 A1     May 12, 2022

(30) Foreign Application Priority Data
Feb. 7, 2020     (KR) ................. 10-2020-0014827

(51) Int. Cl.
*H01M 4/36*     (2006.01)
*H01M 4/04*     (2006.01)
(Continued)

(52) U.S. Cl.
CPC ......... *H01M 4/366* (2013.01); *H01M 4/0404* (2013.01); *H01M 4/364* (2013.01);
(Continued)

(58) Field of Classification Search
CPC .... H01M 4/366; H01M 4/0404; H01M 4/364; H01M 4/386; H01M 4/583; H01M 4/663;
(Continued)

(56) References Cited

U.S. PATENT DOCUMENTS

2007/0252154 A1* 11/2007 Uchiyama ............ B28D 5/0011
438/105
2010/0028767 A1     2/2010 Inose et al.
(Continued)

FOREIGN PATENT DOCUMENTS

CN     201067736 Y     6/2008
CN     101640280 A     2/2010
(Continued)

OTHER PUBLICATIONS

Extended European Search Report including Written Opinion for Application No. 21749758.5 dated Apr. 7, 2022, pp. 1-9.
(Continued)

*Primary Examiner* — Abdullah A Riyami
*Assistant Examiner* — Nader J Alhawamdeh
(74) *Attorney, Agent, or Firm* — Lerner David LLP (57) ABSTRACT

The present technology relates to an electrode manufacturing method, an electrode manufactured by the method, and a secondary battery comprising same, the electrode manufacturing method comprising a cleaning step performed by laser irradiation, in lines corresponding to each other in a direction perpendicular to an electrode current collector, onto a top-coated electrode mixture layer and a back-coated electrode mixture layer of the electrode current collector, and may prevent a mismatch of the electrode mixture layers (Continued)

and may significantly reduce the degree of sliding occurrence at the boundary region.

10 Claims, 3 Drawing Sheets

(51) Int. Cl.
*H01M 4/38* (2006.01)
*H01M 4/583* (2010.01)
*H01M 4/66* (2006.01)
*H01M 4/02* (2006.01)

(52) U.S. Cl.
CPC ........... *H01M 4/386* (2013.01); *H01M 4/583* (2013.01); *H01M 4/663* (2013.01); *H01M 2004/027* (2013.01); *H01M 2004/028* (2013.01)

(58) Field of Classification Search
CPC ..... H01M 2004/027; H01M 2004/028; H01M 10/0404; H01M 10/0413; H01M 10/0587; H01M 10/052; H01M 2220/30; H01M 4/04; H01M 4/139; H01M 2004/021; H01M 2010/4292; B23K 2101/36; B23K 26/351; B23K 26/40; B23K 26/352; B23K 26/362; Y02E 60/10; Y02P 70/50
See application file for complete search history.

(56) References Cited

U.S. PATENT DOCUMENTS

| | | | | |
|---|---|---|---|---|
| 2011/0171757 A1* | 7/2011 | Yamamuro | .......... | B23K 26/364 257/E31.11 |
| 2014/0038042 A1 | 2/2014 | Rios et al. | | |
| 2017/0072512 A1* | 3/2017 | Umehara | ............. | B23K 26/402 |
| 2017/0373299 A1 | 12/2017 | Takeda et al. | | |
| 2018/0166684 A1 | 6/2018 | Rios et al. | | |
| 2018/0287124 A1* | 10/2018 | Kambayashi | ....... | H01M 50/169 |
| 2019/0044186 A1* | 2/2019 | Kim | ..................... | H01M 4/382 |
| 2019/0081345 A1 | 3/2019 | Lee et al. | | |
| 2019/0267608 A1* | 8/2019 | Choi | ....................... | H01M 4/04 |
| 2020/0223010 A1* | 7/2020 | Umehara | ............ | H01M 4/0404 |
| 2022/0149355 A1* | 5/2022 | Choi | ................... | B23K 26/352 |

FOREIGN PATENT DOCUMENTS

| | | | |
|---|---|---|---|
| CN | 107210494 | A | 9/2017 |
| CN | 108292743 | A | 7/2018 |
| JP | H1064587 | A | 3/1998 |
| JP | 2008004281 | A | 1/2008 |
| JP | 2008243658 | A | 10/2008 |
| JP | 2013171669 | A | 9/2013 |
| JP | 2013178936 | A | 9/2013 |
| JP | 2015076229 | A | 4/2015 |
| JP | 6206222 | B2 | 10/2017 |
| JP | 2018088357 | A | 6/2018 |
| JP | 2019029256 | A | 2/2019 |
| KR | 20060010650 | A | 2/2006 |
| KR | 100614369 | B1 | 8/2006 |
| KR | 20150122940 | A | 11/2015 |
| KR | 101719031 | B1 | 3/2017 |
| KR | 20170100376 | A | 9/2017 |
| KR | 20170100377 | A | 9/2017 |
| KR | 20170135122 | A | 12/2017 |
| KR | 20180001229 | A | 1/2018 |
| WO | WO-2018004177 A1 * | | 1/2018 ............ H01M 10/04 |

OTHER PUBLICATIONS

International Search Report for Application No. PCT/KR2021/000816, mailing Apr. 28, 2021, 3 pages.

* cited by examiner

ELECTRODE MANUFACTURING METHOD COMPRISING CLEANING STEP USING LASER, ELECTRODE MANUFACTURED BY METHOD, AND SECONDARY BATTERY COMPRISING SAME

CROSS-REFERENCE TO RELATED APPLICATIONS

This application is a national phase entry under 35 U.S.C. § 371 of International Application No. PCT/KR2021/000816, filed on Jan. 21, 2021, which claims priority from Korean Patent Application No. 10-2020-00014827, filed on Feb. 7, 2020, which are hereby incorporated herein by reference in their entirety.

TECHNICAL FIELD

The present invention relates to a method for manufacturing an electrode including a cleaning step by laser, an electrode manufactured by the method, and a secondary battery including the same.

BACKGROUND ART

With the increase in technology development and demand for mobile devices, the demand for secondary batteries is also rapidly increasing. Among them, lithium secondary batteries are widely used as an energy source for various electronic products as well as various mobile devices because of their high energy density and high operating voltage and excellent storage and lifetime characteristics.

In addition, the secondary battery has attracted attention as an energy source of an electric vehicle, a hybrid electric vehicle, etc., which are proposed as a solution for air pollution of existing gasoline vehicles and diesel vehicles using fossil fuel. In order to be applied as an energy source of an electric vehicle, a high-power battery is required.

Figure 1:
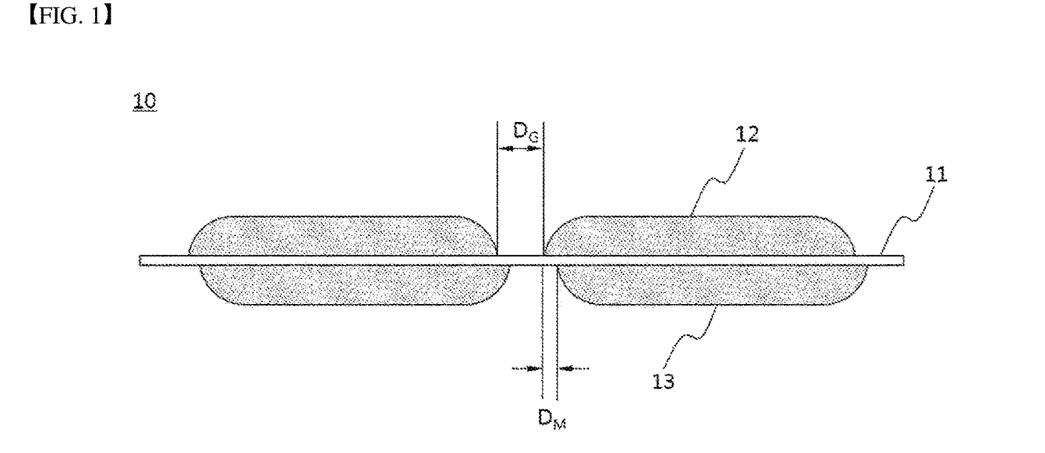
FIG. 1 is a cross-sectional view illustrating a structure of an electrode formed according to the prior art.

FIG. 1 is a cross-sectional view illustrating a structure of an electrode formed according to the prior art. Referring to FIG. 1, a first electrode 10 has a structure in which a top-coated electrode mixture layer 12 and a back-coated electrode mixture layer 13 are formed on opposite surfaces of a current collector 11. Further, each of the electrode mixture layers 12 and 13 includes a coated part, on which an electrode mixture layer has been applied, and a non-coated part. A separation distance between coated parts having the electrode mixture layer formed thereon means a width (DG) of the non-coated part. In the prior art, the electrode mixture layer is top-coated on one surface of the current collector 11, and the electrode mixture layer is back-coated on the opposite surface of the current collector 11, to thereby manufacture an electrode. In this process, a mismatch region of the top/back-coated electrode mixture layers, in which the top-coated electrode mixture layer 12 and the back-coated electrode mixture layer 13 are formed at different positions on the basis of the electrode current collector 11, is generated. Such a mismatch region (DM) decreases the capacity of the electrode and decreases the safety when applied to a secondary battery.

Figure 2:
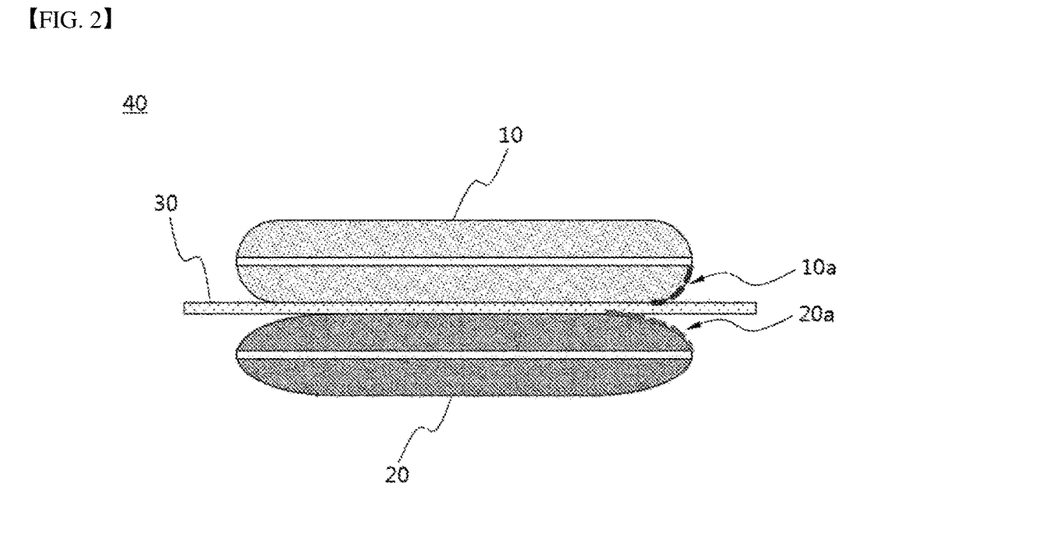
FIG. 2 is a cross-sectional view illustrating a laminated structure of an electrode assembly prepared according to the prior art.

Further, FIG. 2 is a cross-sectional view illustrating a laminated structure of an electrode assembly prepared according to the prior art. Referring to FIG. 2, the existing electrode assembly 40 has a structure in which the first electrode 10 and the second electrode 20 are formed on opposite surfaces on the basis of the separator 30. However, different sliding levels 10a and 20a are shown in the boundary region of the electrode mixture layer in each process of manufacturing the first and second electrodes 10 and 20. Referring to FIG. 2, the sliding level 20a of the end of the coated part of the second electrode is higher than that of the sliding level 10a of the end of the coated part of the first electrode. In the case that the second electrode 20 is a negative electrode, as the loading amount of the positive electrode for the negative electrode becomes greater than a predetermined amount, lithium precipitation occurs in the region, which deteriorates the performance of the battery cell.

DISCLOSURE

Technical Problem

The present invention was devised to solve the above problems, and an object of the present invention is to provide a method for manufacturing an electrode including a cleaning step by laser, an electrode manufactured by the method, and a secondary battery including the same.

Technical Solution

The present invention provides a method for manufacturing an electrode. In one example, a method for manufacturing an electrode includes a step of cleaning an end of a coated part contacting a non-coated part by irradiating laser to a top-coated electrode mixture layer and a back-coated electrode mixture layer of an electrode current collector along a boundary line of the coated part, wherein the cleaning step is performed so that a line of irradiating laser to the top-coated electrode mixture layer of the electrode current collector and a line of irradiating laser to the back-coated electrode mixture layer of the electrode current collector correspond to each other in a direction perpendicular to that of the electrode current collector.

In one example, in the cleaning step, a process of irradiating laser to the top-coated electrode mixture layer of the electrode current collector; and a process of irradiating laser to the back-coated electrode mixture layer of the electrode current collector are performed simultaneously.

In further another example, in the cleaning step, one of two processes including: a process of irradiating laser to the top-coated electrode mixture layer of the electrode current collector; and a process of irradiating laser to the back-coated electrode mixture layer of the electrode current collector is first performed, and a remaining one of the two processes is then performed.

In one example, the method further includes a step of top-coating an electrode mixture layer and a step of back-coating the electrode mixture layer before the cleaning step, wherein a formation area of the top-coated electrode mixture layer and a formation area of the back-coated electrode mixture layer are in a range of 101 to 105% of an area of a predetermined final electrode mixture layer, respectively.

In one example, the cleaning step is performed so that a formation angle at the end of the coated part becomes 75° or more on a boundary line of the coated part contacting the non-coated part.

The present invention also provides an electrode made by the manufacturing method described above. In one example, an electrode according to the present invention includes: an electrode current collector; a top-coated electrode mixture layer; and a back-coated electrode mixture layer, wherein a ratio (RWa/RWb) of a weight ratio (RWa) of the back-coated electrode mixture layer to the top-coated electrode mixture layer per a unit area (1 cm×1 cm) selected from a region (boundary region) including a boundary line of the coated part, to a weight ratio (RWb) of the back-coated electrode mixture layer to the top-coated electrode mixture layer per a unit area selected from a region (central region) which does not include the boundary line of the coated part, is in a range of 0.85 to 1.15 on a basis of the top-coated electrode mixture layer and the back-coated electrode mixture layer facing each other while interposing the electrode mixture layer therebetween.

In another example, a formation angle at an end of the top-coated electrode mixture layer and a formation angle at an end of the back-coated electrode mixture layer are in a range of 75° to 90°, respectively, on the boundary line of the coated part contacting the non-coated part.

Further, the present invention provides an electrode assembly including the electrode described above. In one example, an electrode assembly according to the present invention includes: a positive electrode, a negative electrode, and a separator interposed between the positive electrode and the negative electrode, wherein a ratio (RW2/RW1) of a weight ratio (RW2) of a positive electrode mixture layer to a negative electrode mixture layer per a unit area (1 cm×1 cm) selected from a region (boundary region) including a boundary line of a coated part, to a weight ratio (RW1) of the positive electrode mixture layer to the negative electrode mixture layer per a unit area (1 cm×1 cm) selected from a region (central region) which does not include the boundary line of the coated part is in a range of 0.8 to 1 on a basis of a positive electrode and a negative electrode facing each other while interposing the separator therebetween.

In another example, the negative electrode includes: a current collector layer; and a negative electrode mixture layer formed on opposite surfaces of the current collector layer and including a negative electrode active material, wherein the negative electrode active material includes a silicon (Si)-based active material.

In further another example, the negative electrode includes: a current collector layer; and a negative electrode mixture layer formed on opposite surfaces of the current collector layer and including a negative electrode active material, wherein the negative electrode active material includes a carbon-based active material and a silicon-based active material in a 10 to 95:5 to 90 weight ratio.

In addition, the present invention provides a secondary battery including the above described electrode assembly.

Advantageous Effects

According to the method for manufacturing an electrode according to the present invention, a mismatch of the electrode mixture layer can be prevented and the sliding generation level in the boundary region can be significantly reduced through a cleaning step which is performed so that a line of irradiating laser to the top-coated electrode mixture layer of the electrode current collector and a line of irradiating laser to the back-coated electrode mixture layer of the electrode current collector correspond to each other in a direction perpendicular to that of the electrode current collector.

DETAILED DESCRIPTION OF THE PREFERRED EMBODIMENTS

The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention.

A method for manufacturing an electrode according to the present invention includes a step of cleaning an end of a coated part contacting a non-coated part by irradiating laser to a top-coated electrode mixture layer and a back-coated electrode mixture layer of an electrode current collector along a boundary line of the coated part. In one embodiment, the cleaning step is performed so that a line of irradiating laser to the top-coated electrode mixture layer of the electrode current collector and a line of irradiating laser to the back-coated electrode mixture layer of the electrode current collector correspond to each other in a direction perpendicular to that of the electrode current collector.

In the present invention, the end of the coated part is cleaned through a process of irradiating laser to the top-coated electrode mixture layer and the back-coated electrode mixture layer of the electrode current collector. At this time, the laser irradiation is performed to correspond to each other in a direction that is perpendicular to the electrode current collector. As such, the mismatched region of two electrode mixture layers is minimized by allowing the end of the coated part of the top-coated electrode mixture layer to correspond to the end of the coated part of the back-coated electrode mixture layer at the same position. Further, in the present invention, the formation angle of the end of the coated part of opposite electrode mixture layers can be precisely controlled.

In one example, in the cleaning step, a process of irradiating laser to the top-coated electrode mixture layer of the electrode current collector; and a process of irradiating laser to the back-coated electrode mixture layer of the electrode current collector are performed simultaneously. In further another example, in the cleaning step, one of two processes including: a process of irradiating laser to the top-coated electrode mixture layer of the electrode current collector; and a process of irradiating laser to the back-coated electrode mixture layer of the electrode current collector is first performed, and a remaining one of the two processes is then performed. In the present invention, a top-coated electrode mixture layer and a back-coated electrode mixture layer are provided on a basis of an electrode current collector, and a line of irradiating laser to the top-coated electrode mixture layer of the electrode current collector and a line of irradiating laser to the back-coated electrode mixture layer of the electrode current collector correspond to each other in a direction perpendicular to that of the electrode current collector. In this case, the laser irradiation on opposite surfaces may be simultaneously or sequentially performed.

In one example, the method further includes a step of top-coating an electrode mixture layer and a step of back-coating the electrode mixture layer before the cleaning step, wherein a formation area of the top-coated electrode mixture layer and a formation area of the back-coated electrode mixture layer are in a range of 101 to 105% of an area of a predetermined final electrode mixture layer, respectively. In the present invention, after forming the electrode mixture layer, a step of cleaning the end of the electrode mixture layer is performed. Therefore, in the process of forming an electrode mixture layer in the electrode current collector, the electrode mixture layer is formed in an area greater than the area of the final electrode current collector in consideration of the cleaning step.

In another example, the cleaning step is performed so that a formation angle at the end of the coated part becomes 75° or more on a boundary line of the coated part contacting the non-coated part. The formation angle of the end of the coated part on the boundary line of the coated part contacting the non-coated part is also referred to as a sliding angle. Specifically, it means the angle of the boundary portion which reaches from the end of the coated part up to the average height of the central portion of the coated part on the basis of the same plane as that of the electrode current collector. In the present invention, it is possible to form the formation angle of the end of the coated part to be at a very high level, specifically to be close to 90°. For example, in the present invention, the formation angle of the end of the coated part is in a range of 75° to 90°, 80° to 90°, 75° to 88°, 80° to 85°, or 85° to 90°.

The present invention also provides an electrode made of a method described above. In one example, an electrode according to the present invention includes: an electrode current collector; a top-coated electrode mixture layer; and a back-coated electrode mixture layer, wherein a ratio (RWa/RWb) of a weight ratio (RWa) of the back-coated electrode mixture layer to the top-coated electrode mixture layer per a unit area (1 cm×1 cm) selected from a region (boundary region) including a boundary line of the coated part, to a weight ratio (RWb) of the back-coated electrode mixture layer to the top-coated electrode mixture layer per a unit area selected from a region (central region) which does not include the boundary line of the coated part, is in a range of 0.85 to 1.15 on a basis of the top-coated electrode mixture layer and the back-coated electrode mixture layer facing each other while interposing the electrode mixture layer therebetween. In the present invention, the ratio ($R_{Wa}/R_{Wb}$) is result of the comparison of uniformities or mismatch levels of the electrode mixture layers formed on opposite surfaces of the electrode current collector in the central region and the boundary region of the coated part. Specifically, the ratio ($R_{Wa}/R_{Wb}$) is in a range of 0.85 to 1.1, 0.85 to 1, 0.9 to 1.15, 0.9 to 1.1, 1 to 1.15, or 0.95 to 1.05.

In another example, a formation angle at an end of the top-coated electrode mixture layer and a formation angle at an end of the back-coated electrode mixture layer are in a range of 75° to 90°, respectively, on the boundary line of the coated part contacting the non-coated part. In the present invention, it is possible to form the formation angle of the end of the coated part to be at a very high level, specifically to be close to 90°. For example, in the present invention, the formation angle of the end of the coated part is in a range of 75° to 90°, 80° to 90°, 75° to 88°, 80° to 85°, or 85° to 90°.

Specifically, the electrode is an electrode for a secondary battery, and may be applied to, for example, a positive electrode, a negative electrode, or opposite a positive electrode and a negative electrode.

Further, the present invention provides an electrode assembly including the electrode described above.

The present invention provides an electrode assembly including a positive electrode; a negative electrode; and a separator interposed between the positive electrode and the negative electrode. In one example, a ratio (RW2/RW1) of a weight ratio (RW2) of a positive electrode mixture layer to a negative electrode mixture layer per a unit area (1 cm×1 cm) selected from a region (boundary region) including a boundary line of a coated part, to a weight ratio (RW1) of the positive electrode mixture layer to the negative electrode mixture layer per a unit area (1 cm×1 cm) selected from a region (central region) which does not include the boundary line of the coated part is in a range of 0.8 to 1 on a basis of a positive electrode and a negative electrode facing each other while interposing the separator therebetween.

The ratio ($R_{W2}/R_{W1}$) means the level in which the ratio of the negative electrode mixture layer corresponding to the loading amount of the positive electrode mixture layer is uniform, and the ratio specifically shows the result of comparison of the central region and the boundary region of the coated part. In the process of discharging the electrode mixture layer on the electrode current collector, a sliding phenomenon of the coating thickness occurs at the end of the coated part. In this process, if the sliding level of the negative electrode becomes greater than that of the positive electrode, the loading amount of the negative electrode facing the positive electrode may become relatively small, which may deteriorate the performance of the battery cell by lithium precipitation. In the present invention, the case that the ratio ($R_{W2}/R_{W1}$) is 1 is the case that the positive electrode mixture layer and the negative electrode are formed at a constant ratio on the central region and the boundary region. When the ratio ($R_{W2}/R_{W1}$) is greater than 1, it indicates that the negative electrode mixture layer has relatively been less formed on the boundary region. Specifically, the ratio ($R_{W2}/R_{W1}$) is a range of 0.85 to 1, 0.9 to 1, or 0.95 to 1.

In one example, the negative electrode includes: a current collector layer; and a negative electrode mixture layer formed on opposite surfaces of the current collector layer and including a negative electrode active material, and the negative electrode active material includes a silicon (Si)-based active material. In further another example, the negative electrode includes: a current collector layer; and a negative electrode mixture layer formed on opposite surfaces of the current collector layer and including a negative electrode active material, and the negative electrode active material includes a carbon-based active material and a silicon-based active material in weight ratios of 10 to 95:5 to 90.

In addition, the present invention provides a secondary battery including the electrode described above. Specifically, the secondary battery includes a positive electrode, a negative electrode, and a separator interposed between the positive electrode and the negative electrode, and the positive electrode is as described above. For example, the secondary battery is a lithium secondary battery. Specifically, the lithium secondary battery may include, for example, an electrode assembly described above; a non-aqueous electrolyte solution impregnating the electrode assembly; and a battery case containing the electrode assembly and the non-aqueous electrolyte solution.

The positive electrode has a structure in which a positive electrode mixture layer is formed on one or opposite sides of a positive electrode current collector. In one example, the positive electrode mixture layer includes a conductive material and a binder polymer in addition to the positive electrode active material, and if necessary, may further include a positive electrode additive commonly used in the art. When the electrode according to the present invention is applied as the positive electrode of the secondary battery, the positive electrode has a structure in which the positive electrode mixture layer is formed on opposite surfaces of the positive electrode current collector.

The current collector used for the positive electrode is a metal having high conductivity, and any metal which the positive electrode active material slurry may be easily attached to and which is not reactive in the voltage range of the secondary battery can be used. Specifically, non-limiting examples of the current collector for the positive electrode include aluminum, nickel, or a foil manufactured by a combination thereof.

In one example, the negative electrode includes: a current collector layer; and a negative electrode mixture layer formed on one or opposite surfaces of the current collector layer and including a negative electrode active material, and the negative electrode active material includes a silicon (Si)-based active material.

The silicon-based active material includes one or more selected from the group consisting of silicon (Si), silicon oxide (SiOx, 0<x≤2), and a silicon-metal (M) alloy (here, the metal (M) includes at least one of Cr and Ti). For example, the active material containing a silicon component is at least one of silicon (Si) and silicon oxide (SiOx, 0<x≤2).

In the present invention, a silicon-based active material may be applied as an active material applied to the negative electrode mixture layer, and in some cases, a carbon-based active material and a silicon-based active material may be mixed. When a carbon-based active material and a silicon-based active material are mixed and used, the mixture layer may be formed as a single layer or may be formed by dividing into two or more layers.

In one example, the negative electrode includes: a current collector layer; and a negative electrode mixture layer formed on one or opposite surfaces of the current collector layer and including a negative electrode active material, and the negative electrode active material includes a carbon-based active material and a silicon-based active material. When the electrode according to the present invention is applied as the negative electrode of the secondary battery, the negative electrode has a structure in which the negative electrode mixture layer is formed on opposite surfaces of the negative electrode current collector.

As the carbon-based active material, low crystalline carbon and/or high crystalline carbon may be used. Representative examples of low crystalline carbon include soft carbon and hard carbon. Representative examples of high crystalline carbon include natural graphite, kish graphite, pyrolytic carbon, mesophase pitch based carbon fiber, mesocarbon microbeads, mesophase pitches, and high-temperature calcined carbons such as petroleum or coal tar pitch derived cokes. For example, the carbon-based active material is a commonly used graphite component.

In another embodiment, in the negative electrode active material, the content ratio of the carbon-based active material and the silicon-based active material is in the range of 10 to 95:5 to 90 by weight. Specifically, the content ratio of the carbon-based active material and the silicon-based active material is in the range of 20 to 95:5 to 80 weight ratio, 30 to 80:20 to 70 weight ratio, 50 to 80:20 to 50 weight ratio, 70 to 80:20 to 30 weight ratio, 10 to 80:20 to 90 weight ratio, 10 to 50:50 to 90 weight ratio, 10 to 30:70 to 90 weight ratio, 30 to 60:40 to 70 weight ratio, 40 to 50:50 to 60 weight ratio or 40 to 60:40 to 60 weight ratio. Compared to the carbon-based active material, the silicon-based active material has the advantage of increasing the capacity of the battery. However, the silicon-based active material causes a large change in volume during charging and discharging. This volume change has a problem of accelerating the deterioration of the electrode or the deterioration of the battery life. In addition, the silicone-based active material has a limitation in that a large amount of a binder or a conductive material should be mixed to improve the life of the silicone-based component. However, in the present invention, by mixing and using a carbon-based active material, the volume change during charging and discharging can be reduced to a certain level, and the content of the binder or the conductive material can be reduced.

Non-limiting examples of the current collector used for the negative electrode include copper, gold, nickel, or a foil manufactured by a copper alloy or a combination thereof. In addition, the current collector may be used by stacking substrates made of the above materials.

In addition, the negative electrode may include a conductive material and a binder commonly used in the art.

The separator may be made of any porous substrate used in a lithium secondary battery, and for example, a polyolefin-based porous membrane or a nonwoven fabric may be used, but the present invention is not particularly limited thereto. Examples of the polyolefin-based porous membrane include polyethylene such as high density polyethylene, linear low density polyethylene, low density polyethylene, ultra high molecular weight polyethylene, and a membrane in which polyolefin-based polymers, such as polypropylene, polybutylene, and polypentene, are each formed alone or in a mixture thereof.

According to an embodiment of the present invention, the electrolyte may be a non-aqueous electrolyte. Examples of the non-aqueous electrolyte include N-methyl-2-pyrrolidinone, propylene carbonate, ethylene carbonate, butylenecarbonate, dimethyl carbonate, diethyl carbonate, gamma-Butyrolactone, 1,2-dimethoxyethane, tetrahydroxyfuran, 2-methyltetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxymethane, dioxolane derivatives, sulfolane, methyl sulfolane, 1,3-dimethyl-2-imidazolidinone, propylene carbonate derivatives, tetrahydrofuran derivatives, ethers, methyl pyrophosphate, ethyl propionate, etc. However, it is not particularly limited thereto, and a number of electrolyte components commonly used in the field of lithium secondary batteries may be added or subtracted within an appropriate range.

In addition, the present invention includes a device including the secondary battery described above. In a specific example, the device is at least one of a mobile device, a wearable device, a laptop computer, and an automobile. For example, the vehicle is a hybrid or electric vehicle.

DETAILED DESCRIPTION OF THE PREFERRED EMBODIMENTS

Hereinafter, the present invention will be described in more detail through drawings and the like. However, the embodiments described in the specification and the configurations described in the drawings are only the most preferred embodiments of the present invention, and do not represent all of the technical ideas of the present invention. It is to be understood that there may be various equivalents and variations in place of them at the time of filing the present application.

First Embodiment

Figure 3:
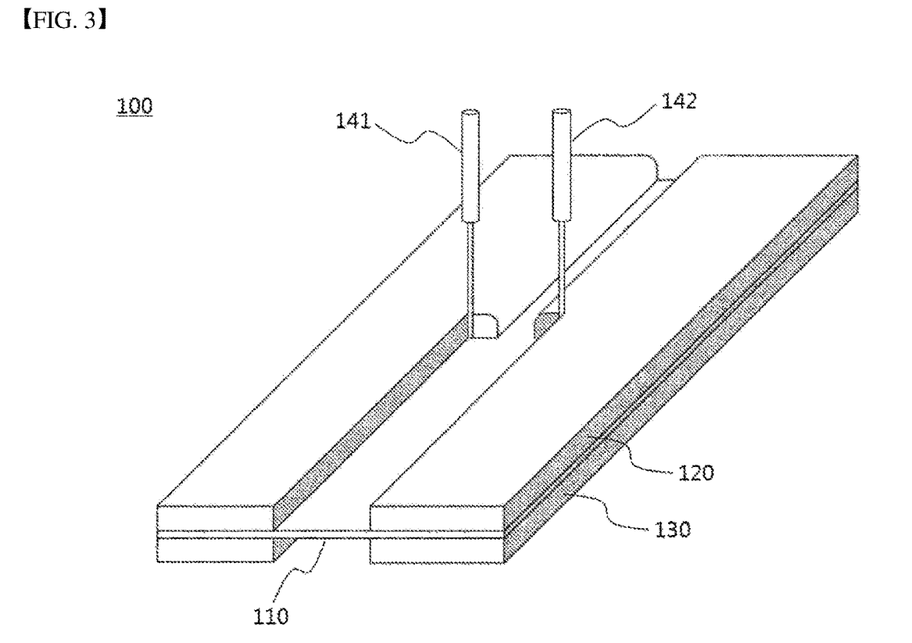
FIG. 3 is a schematic diagram illustrating an electrode manufacturing process according to an embodiment of the present invention.

FIG. 3 is a schematic diagram illustrating an electrode manufacturing process according to an embodiment of the present invention. Referring to FIG. 3, an electrode according to the present invention has a structure in which a top-coated electrode mixture layer 120 and a back-coated electrode mixture layer 130 are formed on opposite surfaces of a current collector 110. In the present invention, the electrode is manufactured through a step 100 of cleaning the end of the coated part through laser irradiations 141 and 142 along the boundary line of the coated part contacting the non-coated part. Generation of a sliding phenomenon at the end of the electrode mixture layers 120 and 130 is prevented through the laser irradiations 141 and 142.

Figure 4:
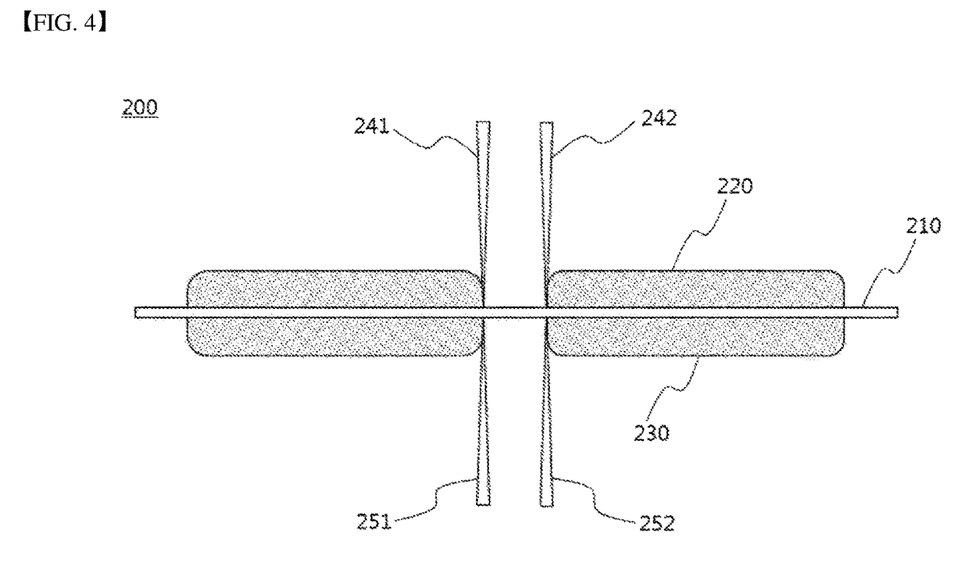
FIG. 4 is a cross-sectional view illustrating an electrode manufacturing process according to an embodiment of the present invention.

FIG. 4 is a cross-sectional view illustrating an electrode manufacturing process according to an embodiment of the present invention. Referring to FIG. 4, the cleaning step 200 of the present invention is performed so that lines irradiating laser to the top-coated electrode mixture layer 220 and the back-coated electrode mixture layer 230 of the electrode current collector 210 correspond to each other in a direction that is perpendicular to the electrode current collector 210. Through this, the formation areas and locations of the top-coated electrode mixture layer 220 and the back-coated electrode mixture layer 230 exactly correspond to each other, and no mismatched region is generated.

Second Embodiment

Figure 5:
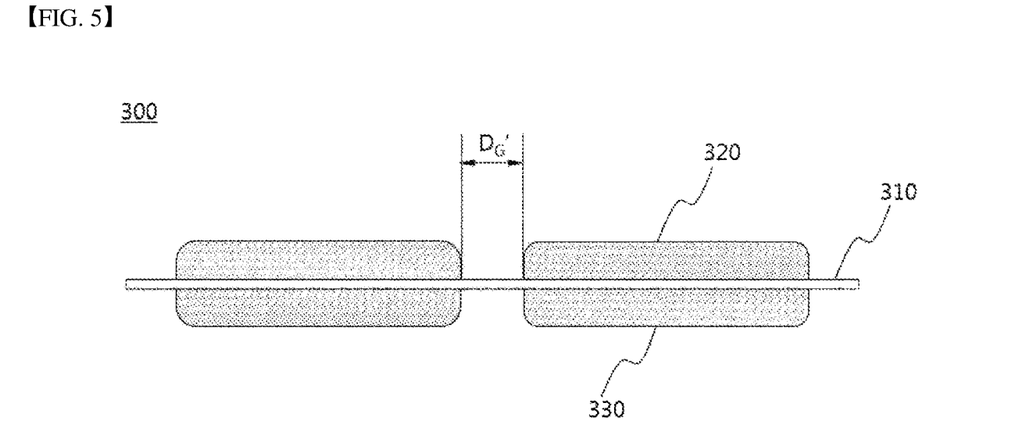
FIG. 5 is a cross-sectional view illustrating a structure of an electrode according to an embodiment of the present invention.

FIG. 5 is a cross-sectional view illustrating a structure of an electrode according to an embodiment of the present invention. Referring to FIG. 5, a first electrode 300 has a structure in which a top-coated electrode mixture layer 320 and a back-coated electrode mixture layer 330 are formed on opposite surfaces of a current collector 310. Further, each of the electrode mixture layers 320 and 330 includes a coated part, on which an electrode mixture layer has been applied, and a non-coated part. A separation distance between coated parts having the electrode mixture layer formed thereon means a width (DG') of the non-coated part. In the present invention, in the cleaning step through laser irradiation, lines irradiating laser to the top-coated electrode mixture layer 320 and the back-coated electrode mixture layer 330 of the electrode current collector 310 correspond to each other in a direction that is perpendicular to the electrode current collector 310. Hence, a mismatch region of the top/back-coated electrode mixture layers, in which the top-coated electrode mixture layer 320 and the back-coated electrode mixture layer 330 are formed at different positions on the basis of the electrode current collector 310, is not generated.

Third Embodiment

Figure 6:
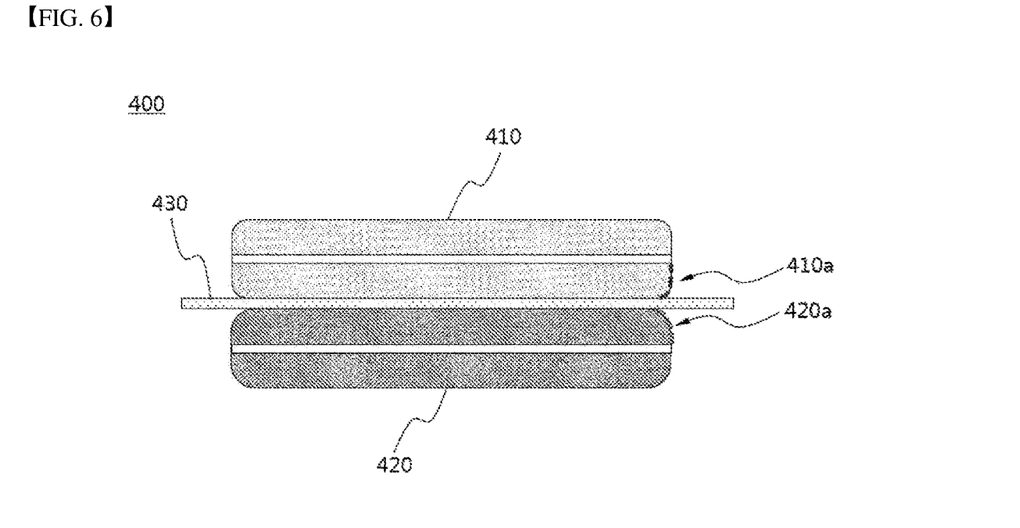
FIG. 6 is a cross-sectional view illustrating a laminated structure of an electrode assembly prepared according to an embodiment of the present invention.

FIG. 6 is a cross-sectional view illustrating a laminated structure of an electrode assembly prepared according to an embodiment of the present invention. Referring to FIG. 6, the electrode assembly 400 has a structure in which the first electrode 410 and the second electrode 420 are formed on opposite surfaces on the basis of the separator 430. Different sliding levels 410a and 420a are generally shown in the boundary region of the electrode mixture layer in each process of manufacturing the first and second electrodes 410 and 420. However, in the present invention, the electrode mixture layer of the first and second electrodes 410 and 420 shows the same or similar sliding levels 410a and 420a in the boundary region through the cleaning step by laser irradiation. As such, the loading ratio of the positive electrode mixture layer corresponding to the negative electrode mixture layer is maintained equally even in the boundary region of the electrode mixture layer.

The above description is merely illustrative of the technical idea of the present invention, and those skilled in the art to which the present invention pertains may make various modifications and variations without departing from the essential characteristics of the present invention. Therefore, the drawings disclosed in the present invention are not intended to limit the technical idea of the present invention but to describe the present invention, and the scope of the technical idea of the present invention is not limited by these drawings. The scope of protection of the present invention should be interpreted by the following claims, and all technical ideas within the scope equivalent thereto should be construed as being included in the scope of the present invention.

DESCRIPTION OF REFERENCE NUMERALS 10, 300, 410: first electrode
10a, 410a: sliding level of end of first electrode coated part
11, 110, 210, 310: electrode current collector
12, 120, 220, 320: top-coated electrode mixture layer
13, 130, 230, 330: back-coated electrode mixture layer
20, 420: second electrode
20a, 420a: sliding level of end of second electrode coated part
30, 430: separator
100, 200: cleaning step
141, 142, 241, 242, 251, 252: laser irradiation
40, 400: electrode assembly
DG: width of non-coated part
$D_M$: mismatched region of top/back-coated electrode mixture layers

The invention claimed is:

1. A method for manufacturing an electrode, comprising:
cleaning an end of a coated part contacting a non-coated part by irradiating laser to a top-coated electrode mixture layer and a back-coated electrode mixture layer of an electrode current collector along a boundary line of the coated part,
wherein the cleaning is performed so that a line of irradiating laser to the top-coated electrode mixture layer of the electrode current collector and a line of irradiating laser to the back-coated electrode mixture layer of the electrode current collector correspond to each other in a direction perpendicular to that of the electrode current collector,
wherein the cleaning is performed so that a formation angle at the end of the coated part is in a range of 75° to 88° on a boundary line of the coated part contacting the non-coated part.

2. The method of claim 1, wherein during the cleaning, a process of irradiating laser to the top-coated electrode mixture layer of the electrode current collector; and a process of irradiating laser to the back-coated electrode mixture layer of the electrode current collector are performed simultaneously.

3. The method of claim 1, wherein during the cleaning, one of two processes including: a process of irradiating laser to the top-coated electrode mixture layer of the electrode current collector; and a process of irradiating laser to the back-coated electrode mixture layer of the electrode current collector is first performed, and a remaining one of the two processes is then performed.

4. The method of claim 1, further comprising top-coating an electrode mixture layer and back-coating the electrode mixture layer before the cleaning,
wherein a formation area of the top-coated electrode mixture layer and a formation area of the back-coated electrode mixture layer are in a range of 101 to 105% of an area of a predetermined final electrode mixture layer, respectively.

5. An electrode comprising:
an electrode current collector;
a top-coated electrode mixture layer; and
a back-coated electrode mixture layer,
wherein a ratio (RWa/RWb) of a weight ratio (RWa) of the back-coated electrode mixture layer to the top-coated electrode mixture layer per a unit area (1 cm×1 cm) selected from a region (boundary region) including a boundary line of the coated part, to a weight ratio (RWb) of the back-coated electrode mixture layer to the top-coated electrode mixture layer per a unit area selected from a region (central region) which does not include the boundary line of the coated part, is in a range of 0.85 to 1.15 on a basis of the top-coated electrode mixture layer and the back-coated electrode mixture layer facing each other while interposing the electrode mixture layer therebetween.

6. The electrode of claim 5, wherein a formation angle at an end of the top-coated electrode mixture layer and a formation angle at an end of the back-coated electrode mixture layer are in a range of 75° to 90°, respectively, on the boundary line of the coated part contacting the non-coated part.

7. An electrode assembly comprising:
a positive electrode;
a negative electrode; and
a separator interposed between the positive electrode and the negative electrode,
wherein a ratio (RW2/RW1) of a weight ratio (RW2) of a positive electrode mixture layer to a negative electrode mixture layer per a unit area (1 cm×1 cm) selected from a region (boundary region) including a boundary line of a coated part, to a weight ratio (RW1) of the positive electrode mixture layer to the negative electrode mixture layer per a unit area (1 cm×1 cm) selected from a region (central region) which does not include the boundary line of the coated part is in a range of 0.8 to 1 on a basis of a positive electrode and a negative electrode facing each other while interposing the separator therebetween.

8. The electrode assembly of claim 7, wherein the negative electrode includes:
a current collector layer; and
a negative electrode mixture layer formed on opposite surfaces of the current collector layer and including a negative electrode active material,
wherein the negative electrode active material includes a silicon (Si)-based active material.

9. The electrode assembly of claim 7, wherein the negative electrode includes:
a current collector layer; and
a negative electrode mixture layer formed on surfaces of the current collector layer and including a negative electrode active material,
wherein the negative electrode active material includes a carbon-based active material and a silicon-based active material in a 10 to 95:5 to 90 weight ratio.

10. A secondary battery comprising an electrode assembly according to claim 7.

\* \* \* \* \*